US008306422B2

(12) United States Patent
Bainbridge et al.

(10) Patent No.: US 8,306,422 B2
(45) Date of Patent: Nov. 6, 2012

(54) WDM PON PROTECTION SCHEME USING A DUAL PORT ARRAYED WAVEGUIDE GRATING (AWG)

(75) Inventors: John Bainbridge, Ottawa (CA); Tom Luk, Ottawa (CA); Giovanni Manto, Ottawa (CA); James Goodchild, Kanata (CA)

(73) Assignee: LG Ericcson Co., Ltd., Seoul (KR)

( * ) Notice: Subject to any disclaimer, the term of this patent is extended or adjusted under 35 U.S.C. 154(b) by 812 days.

(21) Appl. No.: 12/340,989

(22) Filed: Dec. 22, 2008

(65) Prior Publication Data

US 2009/0297152 A1    Dec. 3, 2009

Related U.S. Application Data

(60) Provisional application No. 61/056,106, filed on May 27, 2008.

(51) Int. Cl.
*H04J 14/00* (2006.01)
*H04B 10/00* (2006.01)
(52) U.S. Cl. ............................................. 398/68; 398/7
(58) Field of Classification Search ............ 398/7, 66–68
See application file for complete search history.

(56) References Cited

U.S. PATENT DOCUMENTS

| | | | | |
|---|---|---|---|---|
| 6,055,078 A * | 4/2000 | Chen et al. | ...................... | 398/79 |
| 2003/0030866 A1* | 2/2003 | Yoo | ............................... | 359/128 |
| 2003/0142978 A1* | 7/2003 | Lee et al. | ......................... | 398/34 |
| 2005/0008362 A1* | 1/2005 | Jung et al. | ......................... | 398/5 |
| 2005/0036785 A1* | 2/2005 | Tervonen et al. | ............... | 398/49 |
| 2005/0276603 A1* | 12/2005 | Jung et al. | ........................ | 398/71 |
| 2009/0290866 A1* | 11/2009 | Chung et al. | ...................... | 398/5 |

* cited by examiner

*Primary Examiner* — Nathan Curs
(74) *Attorney, Agent, or Firm* — Ked & Associates LLP

(57) ABSTRACT

A Wavelength Division Multiplexed Passive Optical Network (WDM-PON) includes an Optical Line Terminal (OLT) including a first Arrayed Waveguide Grating (AWG) MUX/DEMUX, and a remote node including a second AWG MUX/DEMUX. Each AWG MUX/DEMUX has at least two input ports for receiving a respective wavelength division multiplexed optical signal, and a plurality of output ports. Each output port of the Optical Line Terminal AWG MUX/DEMUX is coupled to a respective transceiver of the OLT. Each output port of the remote node AWG MUX/DEMUX is coupled to a respective PON having at least one optical network terminal (ONT). Respective first and second optical paths are coupled between corresponding input ports of the first and second AWG MUX/DEMUXs. Means are provided for sourcing seed light of the WDM-PON into a selected one the first and second optical paths.

25 Claims, 6 Drawing Sheets

WDM PON PROTECTION SCHEME USING A DUAL PORT ARRAYED WAVEGUIDE GRATING (AWG)

CROSS-REFERENCE TO RELATED APPLICATIONS

This application is based on, and claims priority from, U.S. Provisional Patent Application Ser. No. 61/056,106 filed May 27, 2008, the entire contents of which are incorporated herein by reference.

FIELD OF THE INVENTION

The present application relates generally to Wavelength Division Multiplexed Passive Optical Networks (WDM PON) and, more specifically, to WDM PON protection using a dual port Arrayed Waveguide Grating (AWG).

BACKGROUND OF THE INVENTION

A passive optical network (PON) is a point-to-multipoint network architecture in which unpowered optical splitters are used to enable a single optical fibre to serve multiple premises. A PON typically includes an Optical Line Terminal (OLT) at the service provider's central office connected to a number (typically 32-128) of Optical Network Terminals (ONTs), each of which provides an interface to customer equipment.

In operation, downstream signals are broadcast from the OLT to the ONTs on a shared fibre network. Various techniques, such as encryption, can be used to ensure that each ONT can only receive signals that are addressed to it. Upstream signals are transmitted from each ONT to the OLT, using a multiple access protocol, such as time division multiple access (TDMA), to prevent "collisions".

A Wavelength Division Multiplexing PON, or WDM-PON, is a type of passive optical network in which multiple optical wavelengths are used to increase the upstream and/or downstream bandwidth available to end users. FIG. 1 is a block diagram illustrating a typical WDM-PON system. As may be seen in FIG. 1, the OLT 4 comprises a plurality of transceivers 6, each of which includes a light source 8 and a detector 10 for sending and receiving optical signals on respective wavelength channels, and an optical combiner/splitter 12 for combining light from/to the light source 8 and detector 10 onto a single optical fibre 14. The light source 8 may be a conventional laser diode such as, for example, a distributed feed-back (DFB) laser, for transmitting data on the desired wavelength using either direct laser modulation, or an external modulator (not shown) as desired. The detector 10 may, for example, be a PIN diode for detecting optical signal received through the network. An optical mux/demux 16 (such as, for example, an Arrayed Waveguide Grating—AWG—, or a Thin-Film Filter—TFF) is used to couple light between each transceiver 6 and an optical fibre trunk 18, which may include one or more passive optical power splitters (not shown).

A passive remote node 20 serving one or more customer sites includes an optical mux/demux 22 (which may, for example, also be an AWG or TFF) for demultiplexing each wavelength channels ($\lambda 1 \ldots \lambda n$) from the optical trunk fibre 18. Each wavelength is then routed to an appropriate PON 24 comprising one or more Optical Network Terminals (ONTs) 26 at respective customer premises. Typically, each ONT 26 includes a light source 28, detector 30 and combiner/splitter 32, all of which are typically configured and operate in a manner mirroring that of the corresponding transceiver 6 in the OLT 4.

The WDM-PON illustrated in FIG. 1 is known, for example, from "Low Cost WDM PON With Colorless Bidirectional Transceivers", Shin, DJ et al, Journal of Lightwave Technology, Vol. 24, No. 1, January 2006. With this arrangement, each PON 24 is served by a predetermined pair of wavelength channels, comprising an L-band channel for downlink signals transmitted from the ONT 4 to the respective PON 24, and a C-band channel for uplink signals transmitted from the respective PON 24 to the ONT 4. The MUX/DEMUX 16 in the ONT 4 directs couples the selected channels of each PON 24 to a respective one of the transceivers 6. Consequently, each transceiver 6 of the ONT is associated with one of the PONs 24, and controls uplink and downlink signalling between the ONT 4 and that PON 24. Each transceiver 6 and 26 in the OLT 4 and ONTs is rendered "colorless", by using reflective light sources 8, 28, such as, reflective semi-conductor optical amplifiers; injection-locked Fabry-Perot lasers; reflective electro-absorptive modulators; and reflective Mach-Zehnder modulators. With this arrangement, each light source 8, 28 requires a "seed" light which is then modulated to produce the respective downlink/uplink optical signals. In the system of FIG. 1, the seed light for downlink signals is provided by an L-band broadband light source (BLS) 32 via an L-band optical circulator 34. Similarly, the seed light for uplink signals is provided by a C-band broadband light source (BLS) 36 via a C-band optical circulator 38. As is known in the art, the BLSs 32 and 36 may be broadband light emitting sources that generate a continuous spectrum, such as a Light Emitting Diode (LED), or may be a multi-frequency laser source which generates a plurality of narrow-band lights.

WDM-PONs suffer limitations in that the fibre trunk 18 and the BLSs 32, 36 constitute single points of failure of the entire network. A failure of any one of these components effectively disconnects all subscribers.

A typical method for implementing WDM-PON protection is to duplicate the WDM-PON system of FIG. 1, with both systems being connected to the same ONTs 26. A less expensive alternative, which provides trunk fibre protection, is illustrated in FIG. 2. As may be seen, this technique employs a switch 40 at each end of the trunk fibre, so that either one of two (or more) alternative fibre routes 42 can be switched in as needed. However, each of the switches 40 requires electrical power in order to operate. In the case of the switch 40a located at the OLT 4, this does not pose a serious problem. However, the remote node 20 is typically passive, and so does not have an electrical power supply. Consequently, installation of an optical switch 40b at the remote node 20 also requires the provision of electrical power, which undesirably increases costs.

This problem can be overcome by replacing the switch 40b at the remote node 20 with a 3 dB combiner 43. However, this solution suffers a limitation in that the combiner introduces optical losses into the system. The theoretical loss is 3 dB, but in practice, losses of about 4 dB are highly likely. This represents a large loss in the WDM PON link budget. The link budget most affected by any additional loss is that of the C-band BLS 36 to the subscriber transceivers 26. A loss of 4 dB represents a fibre length of approximately 13 km, which in a network that is at maximum 20 km long is a considerable penalty.

Typically, a BLS 32,36 is protected using an optical switch 44, as shown in FIG. 2. This arrangement adds approximately 1 dB to the loss of the path. This further loss is added to the 3-4 dB losses caused by switching in the fibre trunk 18, and so compounds the performance penalty associated with the protection switching function.

Techniques for efficiently protecting fibre trunk and/or the Broadband Light Sources (BLSs) in a WDM-PON remain highly desirable.

SUMMARY OF THE INVENTION

An aspect of the present invention provides a Wavelength Division Multiplexed Passive Optical Network (WDM-PON) which includes an Optical Line Terminal (OLT) including a first Arrayed Waveguide Grating (AWG) MUX/DEMUX, and a remote node including a second AWG MUX/DEMUX. Each AWG MUX/DEMUX has at least two input ports for receiving a respective wavelength division multiplexed optical signal, and a plurality of output ports. Each output port of the Optical Line Terminal AWG MUX/DEMUX is coupled to a respective transceiver of the OLT. Each output port of the remote node AWG MUX/DEMUX is coupled to a respective PON having at least one optical network terminal (ONT). Respective first and second optical paths are coupled between corresponding input ports of the first and second AWG MUX/DEMUXs. Means are provided for sourcing seed light of the WDM-PON into a selected one the first and second optical paths.

BRIEF DESCRIPTION OF THE DRAWINGS

Further features and advantages of the present invention will become apparent from the following detailed description, taken in combination with the appended drawings, in which.

DETAILED DESCRIPTION OF PREFERRED EMBODIMENTS

The present invention provides techniques for efficiently protecting fibre trunk and/or the Broadband Light Sources (BLSs) in a Wavelength Division Multiplexing Passive Optical Network (WDM-PON). Representative embodiments are described below with reference to FIGS. 3-5.

Figure 3:
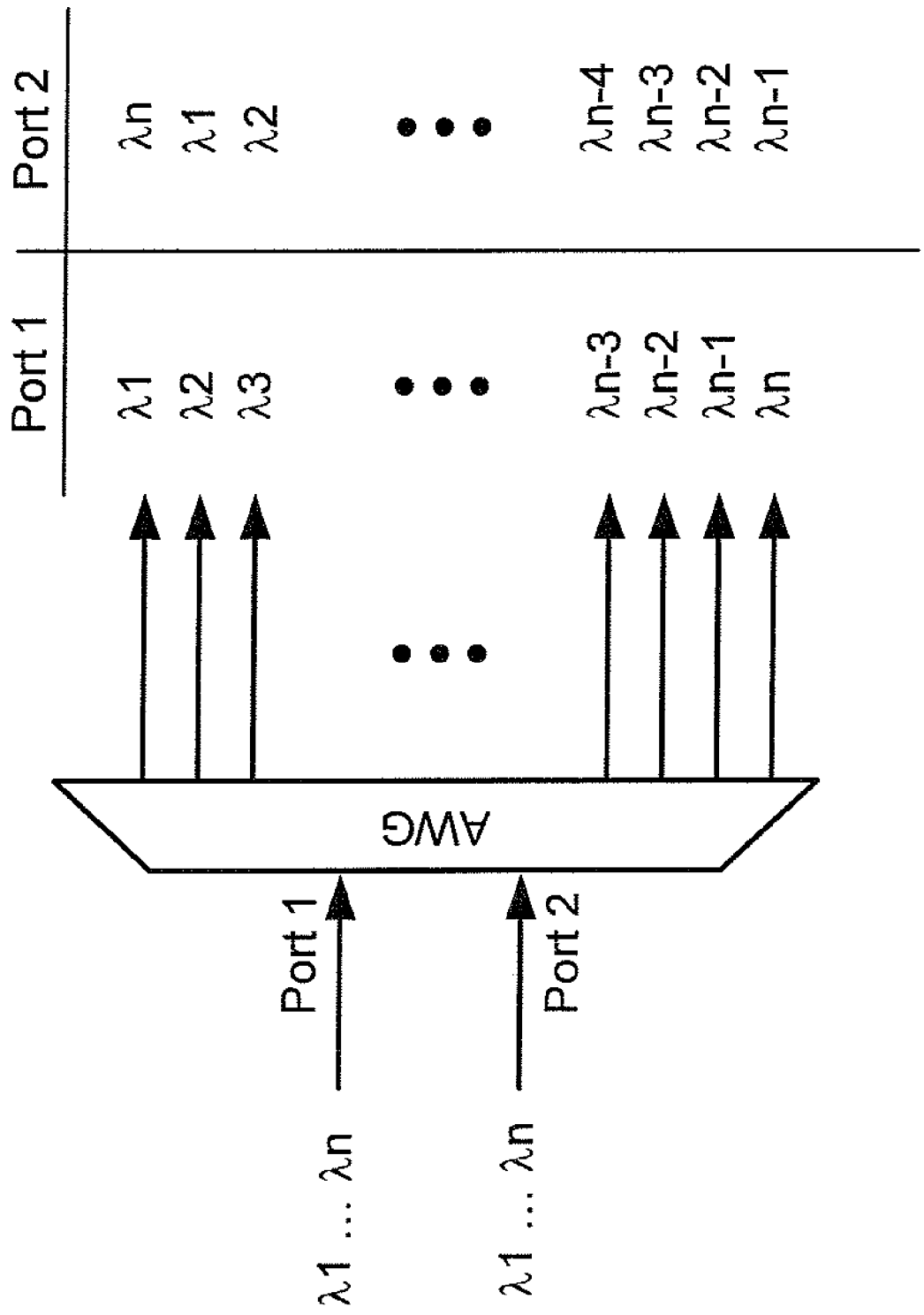
FIG. 3 is a block diagram schematically illustrating periodic wavelength mapping, and resulting channel grids in an Arrayed Waveguide Grating (AWG) MUX/DEMUX.

As is known in the art, conventional Arrayed Waveguide Grating (AWG) MUX/DEMUX devices are sold with a single input port, and multiple output ports. However, the wavelength mapping property of the AWG is inherently periodic, and it is possible configure an AWG with multiple input ports. A treatment of AWGs can be found in "Transmission characteristics of Arrayed Waveguide N×N Wavelength Multiplexer", H. Takahashi et al, Journal of Lightwave Technology, Vol 13, No 3, March 1995, pp 447-455. FIG. 3 illustrates an example of such an AWG, which in this case is configured with two input ports.

As may be seen in FIG. 3, each input port of the AWG may be connected to receive a respective WDM signal comprising channels λ1 . . . λn. For the WDM signal input to port 1, channels λ1 . . . λn are demultiplexed to output ports 1 . . . n of the AWG, such that λ1 appears at output port 1; λ2 appears at output port 2; λ3 appears at output port 3, and so on. However, for the WDM signal input to port 2, channels λ1 . . . λn are demultiplexed to output ports 1 . . . n of the AWG such that λn appears at output port 1; λ1 appears at output port 2; λ2 appears at output port 3, and so on, until λn-1 appears at output port n.

In very general terms, the present invention exploits the periodic wavelength mapping property of an AWG to provide protection for the fibre trunk and/or BLSs in a WDM-PON with colorless transceivers.

In the following description, two alternative embodiments of the invention are described with reference to FIGS. 4 and 5. In a first embodiment, described below with reference to FIG. 4, dual-port AWGs are used to protect both the BLSs 32,36 and the fibre trunk 18. In a second embodiment, described below with reference to FIG. 5, dual-port AWGs are used to protect the fibre trunk 18 only.

BLS and Trunk Fibre Protection

Figure 4:
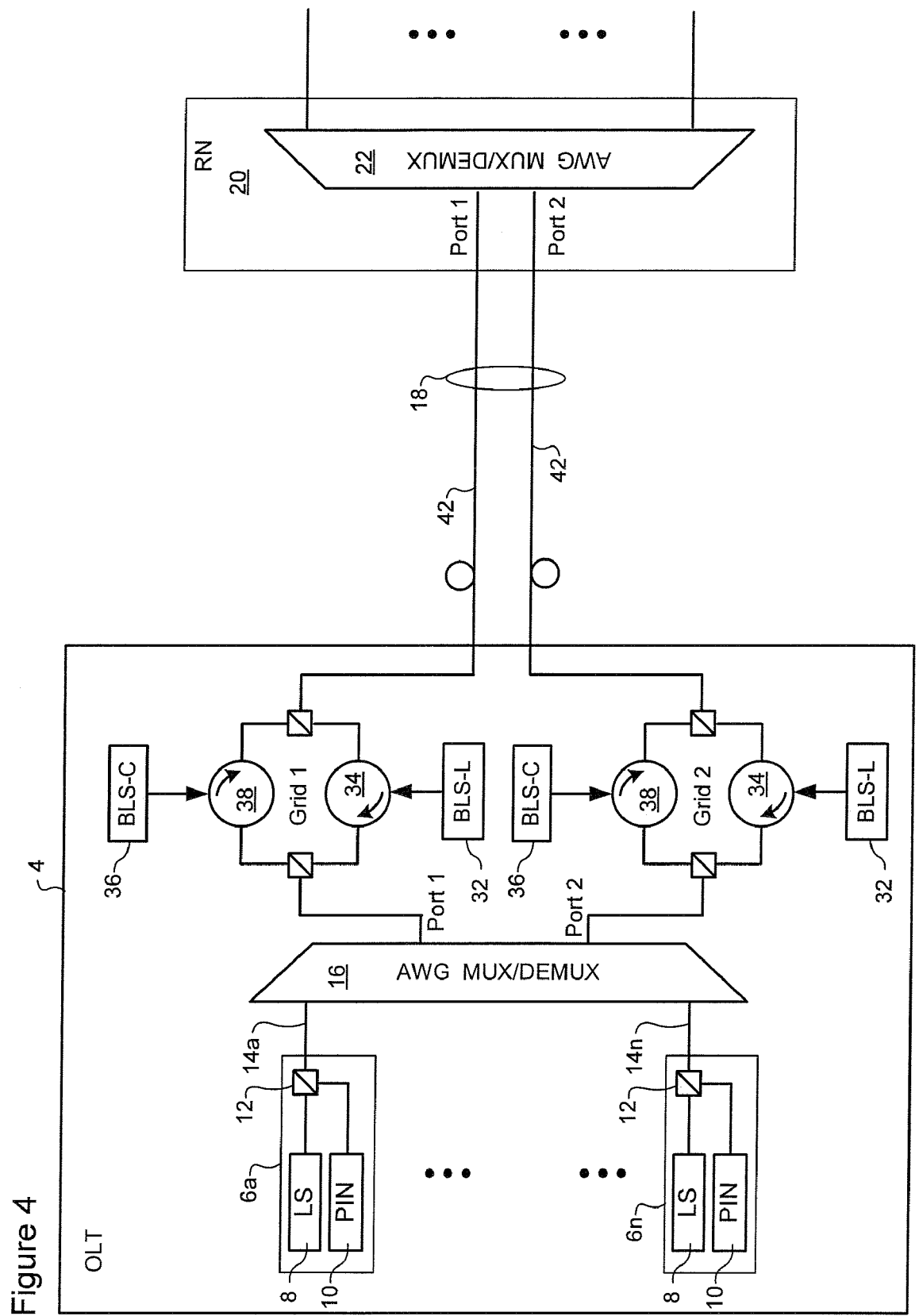
FIG. 4 is a block diagram schematically illustrating a technique for protecting the fibre trunk and Broadband Light Sources of a WDM-PON, in accordance with a first embodiment of the present invention.

Referring to FIG. 4, protection for both the BLSs 32,36 and the fibre trunk 18 can be provided by exploiting the periodic wavelength mapping of the AWG to define two parallel paths between the MUX/DEMUX 16 of the OLT 4 and the remote node 20. As may be seen in FIG. 4, each path extends from one port of the OLT Mux/DEMUX 16 to a corresponding port of the remote node MUX/DEMUX 22, and includes its own set of L-band and C-band BLSs 32 and 36. For convenience, the path connected between port 1 of the OLT MUX/DEMUX 16 and port 1 of the remote node MUX/DEMUX 22 may be designated as a "working" path, while the other path (connected between port 2 of the OLT MUX/DEMUX 16 and port 2 of the remote node MUX/DEMUX 22) is designated as a "protection" path. During normal operation the BLSs 32 and 36 of the working path are powered, while those of the protection path are disabled. In this case, the working path BLSs 32 and 36 will generate seed light for the downlink and uplink signal traffic through the WDM-PON 2, and the "working" channel grid (that is, the allocation of wavelength channels to each PON 24) will be determined by the port-1 wavelength mapping of each of the MUX/DEMUXs 16 and 22. If a failure of the working path (e.g. due to either a fibre break or failure of either working path BLS 32 and 36) is detected, then the OLT 4 will power down the working path BLS 32 and 36 and enable those of the protection path. When this occurs, the protection path will be the active path, and the "protection" channel grid will be determined by the port-2 wavelength mapping of each of the MUX/DEMUXs 16 and 22.

As may be appreciated, the difference between the working and protection channel grids (see FIG. 3) implies that a switch from the working to the protection path will cause a change in the wavelength of the seed light received by each of the respective light sources 8,28 in the OLT and ONT transceivers 6,26. However, provided that this wavelength change is within the operating bandwidth of the involved light sources 8,28 communications through the WDM-PON 2 can be supported using either of the working and protection channel grids.

Figure 1:
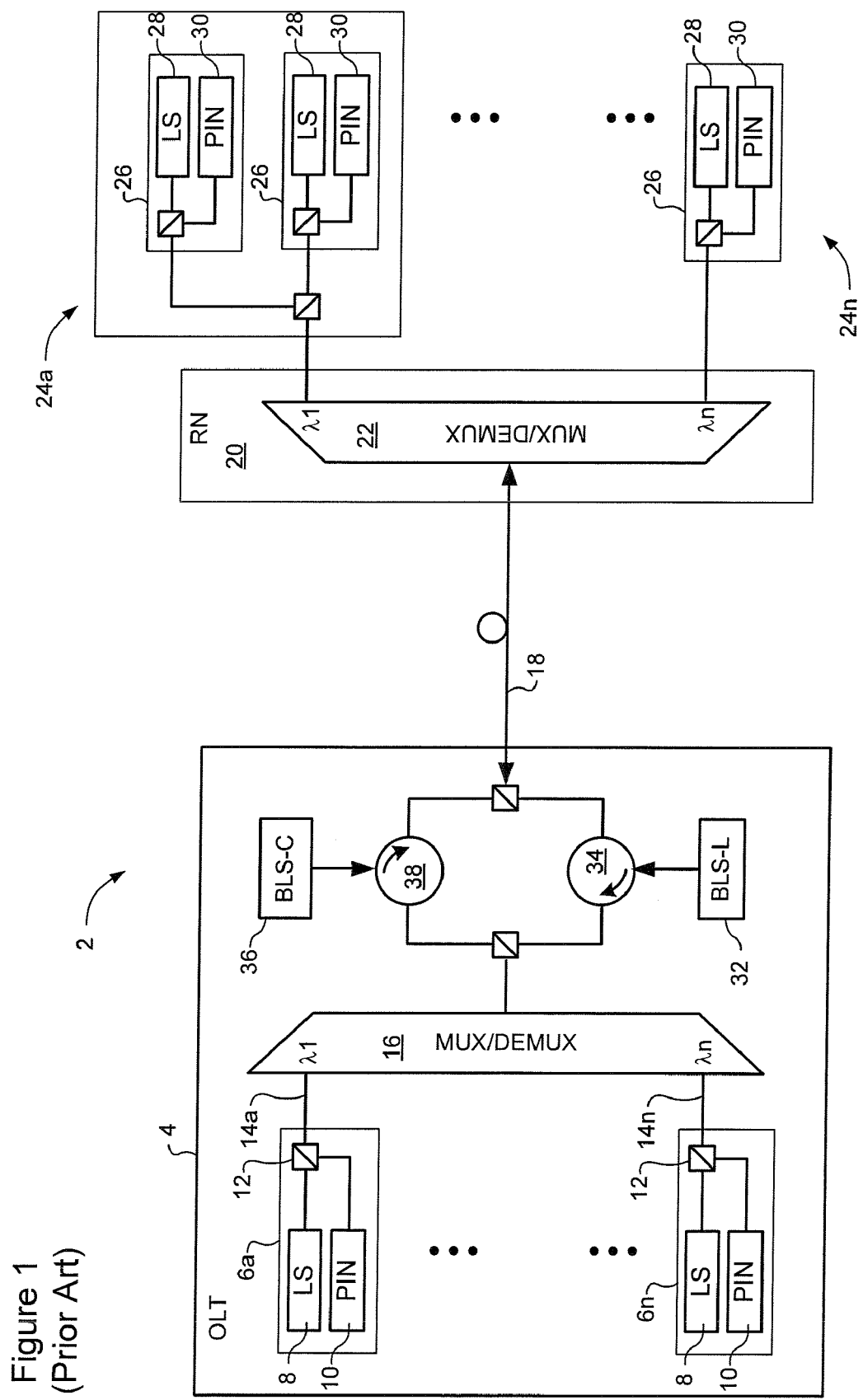
FIG. 1 is a block diagram schematically illustrating a conventional WDM-PON known in the prior art.

An advantage of the network of FIG. 4 is that it incurs no extra loss for implementing protection compared to the unprotected network shown in FIG. 1. If BLS and trunk protection are required then a duplication of BLSs is required regardless of protection strategy. The extra cost of passive devices is mitigated by the preservation of the link budget, and the remote node 20 can remain entirely passive.

Trunk Fibre Only Protection

Figure 5:
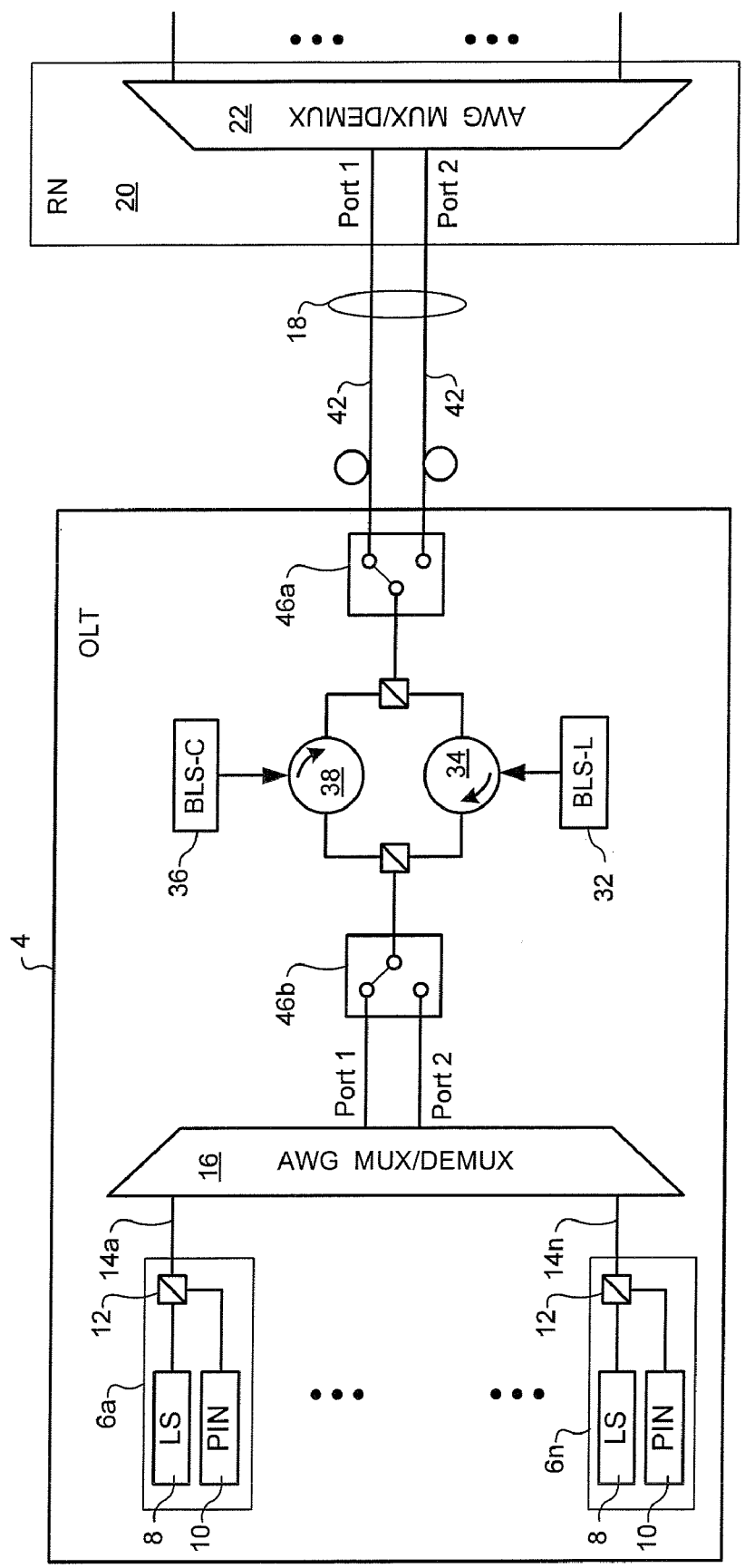
FIG. 5 is a block diagram schematically illustrating a technique for protecting the fibre trunk of a WDM-PON, in accordance with a second embodiment of the present invention It will be noted that throughout the appended drawings, like features are identified by like reference numerals.

Referring to FIG. 5, protection for the fibre trunk 18 alone can be provided by exploiting the periodic wavelength mapping of the AWG to define two parallel paths through the fibre trunk 18, and using a pair of optical switches 46a-b to couple a set of L-band and C-band BLSs 32 and 36 to the appropriate one of the two paths. As may be seen in FIG. 5, this arrangement is similar in operation to the embodiment described above with reference to FIG. 4, except that only one set of BLSs are used. Thus, for example, the path connected between port 1 of the OLT MUX/DEMUX 16 and port 1 of the remote node MUX/DEMUX 22 may be designated as a "working" path, while the other path (connected between port 2 of the OLT MUX/DEMUX 16 and port 2 of the remote node MUX/DEMUX 22) is designated as a "protection" path. During normal operation the optical switches 46a-b are controlled to connect the BLSs 32 and 36 into the working path. In this state, the BLSs 32 and 36 will couple seed light for the downlink and uplink signal traffic into the working path, and the "working channel grid (that is, the allocation of wavelength channels to each PON 24) will be determined by the port-1 wavelength mapping of each of the MUX/DEMUXs 16 and 22. If a failure of the working path (e.g. due to a fibre break) is detected, then the OLT 4 will control the optical switches 46a-b to connect the BLSs 32 and 36 into the protection path. When this occurs, the protection path will be the active path, and the "protection" channel grid will be determined by the port-2 wavelength mapping of each of the MUX/DEMUXs 16 and 22.

As in the embodiment described above with reference to FIG. 5, the difference between the working and protection channel grids (see FIG. 3) implies that switching the BLSs 32 and 36 from the working path to the protection path will cause a change in the wavelength of the seed light received by each of the respective light sources 8,28 in the OLT and ONT transceivers 6,26. However, provided that this wavelength change is within the operating bandwidth of the involved light sources 8,28 communications through the WDM-PON 2 can be supported using either of the working and protection channel grids.

Figure 2A:
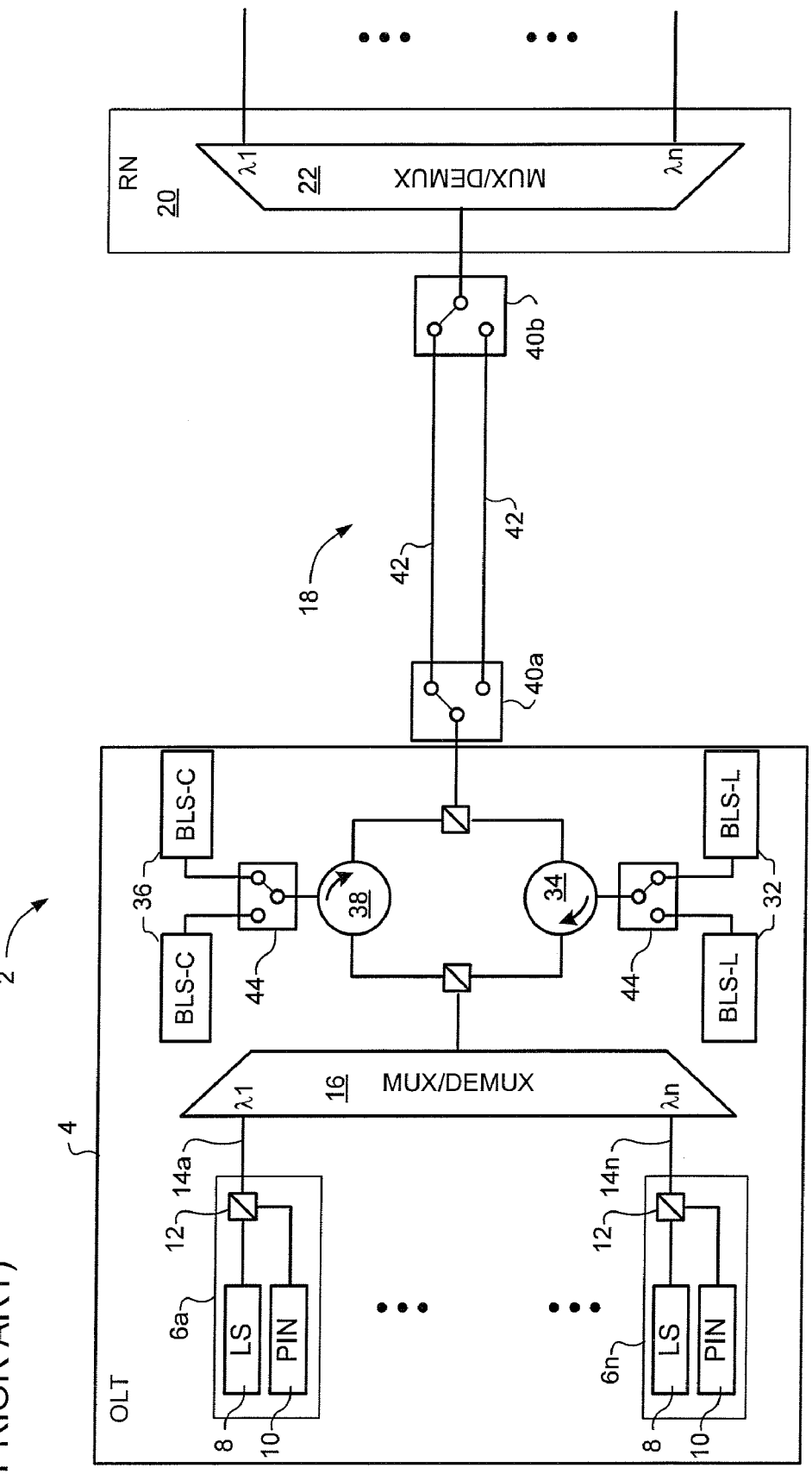
FIGS. 2a and 2b are block diagrams schematically illustrating conventional techniques for protecting the fibre trunk and Broadband Light Sources of the WDM-PON of FIG. 1.
Figure 2B:
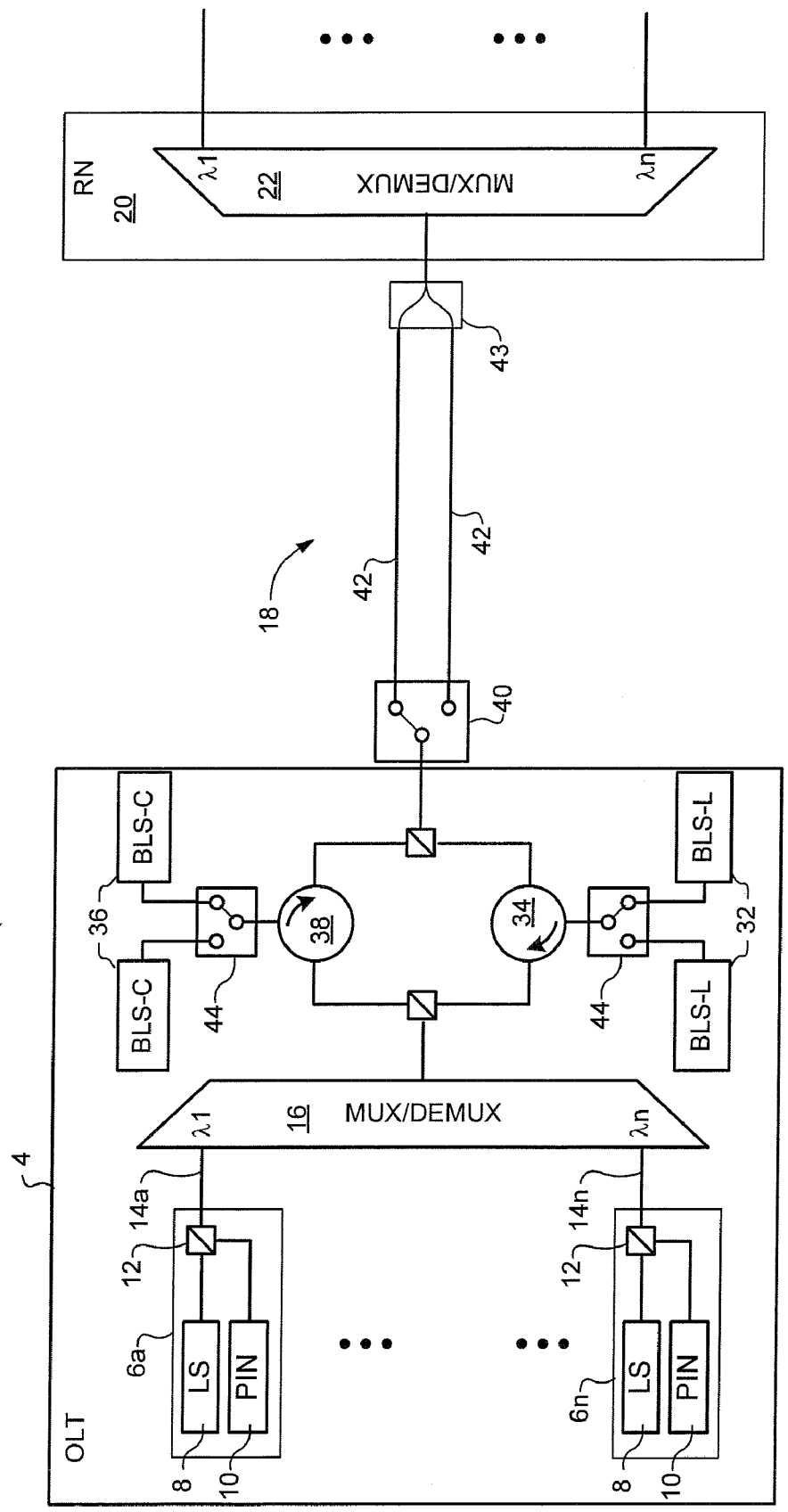

An advantage of the network of FIG. 5 is that it provides protection of the trunk fibre 18 at the cost of adding the two switches 46a-b. Optical Switches are generally low loss (typically less than 1 dB) devices, so that this addition does not incur a large performance penalty. The combination of a switch and the dual input AWG incurs a lower impact on the link budget than, for example, using a switch 40 and a 3 dB combiner 43 with a single input AWG such as shown in FIG. 2b, or having a switch 40b at the remote node 20 which requires power as shown in FIG. 2a.

The embodiments of the invention described above are intended to be illustrative only. The scope of the invention is therefore intended to be limited solely by the scope of the appended claims.

We claim:

1. A Wavelength Division Multiplexed Passive Optical Network (WDM-PON) comprising:
   an Optical Line Terminal (OLT) including a first Arrayed Waveguide Grating (AWG) MUX/DEMUX comprising at least two input ports, each receiving optical signals of different wavelengths, and a plurality of output ports, each output port being coupled to a respective transceiver of the OLT;
   a remote node including a second AWG MUX/DEMUX comprising at least two input ports for receiving the optical signals of different wavelengths, and a plurality of output ports, each output port of the second AWG MUX/DEMUX being coupled to a respective PON having at least one optical network terminal (ONT); and
   respective first and second optical paths coupled between corresponding input ports of the first and second AWG MUX/DEMUXs, wherein:
   seed light of the WDM-PON is input into at least one of the first or second optical paths,
   a first wavelength mapping is defined between a first port of the first AWG and the output ports of the first AWG,
   a second wavelength mapping is defined between a second port of the first AWG and the output ports of the first AWG,
   the first and second wavelength mappings are different, and
   the first and second optical paths are enabled at different times to carry the optical signals of different wavelengths, the first optical path carrying the optical signals of different wavelengths based on the first wavelength mapping and the second optical path carrying the optical signals of different wavelengths based on the second wavelength mapping.

2. The network as claimed in claim 1, further comprising: independent Broadband Light Sources (BLSs) optically coupled to respective ones of the first and second optical paths.

3. The network as claimed in claim 2, wherein the each of the independent Broadband Light Sources (BLSs) comprises a C-band BLS for seeding uplink signals and an L-band BLS for seeding downlink signals.

4. The network as claimed in claim 1, further comprising:
   a pair of optical switches coupled to the first and second optical paths; and
   a Broadband Light Source (BLS), the optical switches being controlled to optically couple the BLS to the first or second optical paths at different times.

5. The network as claimed in claim 4, wherein the Broadband Light Sources (BLSs) comprises a C-band BLS for seeding uplink signals and an L-band BLS for seeding downlink signals.

6. The network as claimed in claim 1, wherein:
   the second signal path is disabled when the first signal path is enabled, and
   the first signal path is disabled when the second signal path is enabled.

7. The network as claimed in claim 6, wherein the second signal path is enabled and the first signal path is disabled when a failure is detected along the first signal path.

8. The network as claimed in claim 7, wherein the failure includes a failure of a light source that provides seed light to the first signal path.

9. The network as claimed in claim 7, wherein the failure includes a failure in a signal carrying medium along the first signal path.

10. The network as claimed in claim 1, wherein:
    the first wavelength mapping is offset by one or more wavelengths from the second wavelength mapping.

11. The network as claimed in claim 1, wherein:
    the first signal path includes one or more first seed light sources, and
    the second signal path includes one or more second seed light sources different from the one or more of the first seed light sources.

12. The network as claimed in claim 1, wherein the first and second signal paths are coupled to one or more same seed light sources.

13. An apparatus comprising:
an input interface to receive optical signals of different wavelengths; and
an output interface coupled to the input interface, wherein:
a first mapping is defined between the optical signal wavelengths received by the input interface and optical signal wavelengths of the output interface;
a second mapping is defined between the optical signal wavelengths received by the input interface and the optical signal wavelengths of the output interface,
the first and second wavelength mappings are different, and
optical signals are output from the output interface based on at least one of the first or second mappings, wherein the output interface has:
a first output port to receive the optical signals of different wavelengths, and
a second output port to receive the optical signals of different wavelengths,
wherein the first output port outputs the optical signals of different wavelengths along a first signal path based on the first mapping and the second output port outputs the optical signals of different wavelengths along a second signal path based on the second mapping, and wherein:
the optical signals of different wavelengths are output along the first signal path based on the first mapping when the second signal path is disabled, and
the optical signals of the different wavelengths are output along the second signal path based on the second mapping with the first signal path is disabled.

14. The apparatus as claimed in claim 13, wherein the first wavelength mapping is offset by one or more wavelengths from the second wavelength mapping.

15. The apparatus as claimed in claim 13, wherein the input interface includes a plurality of input ports.

16. The apparatus of claim 15, wherein each of the plurality of input ports receives the optical signals of different wavelengths.

17. The apparatus as claimed in claim 16, wherein each of the plurality of input ports receives a same number of the optical signals of the different wavelengths.

18. The apparatus as claimed in claim 13, wherein the output interface outputs the optical signals of different wavelengths along different signal paths.

19. The apparatus as claimed in claim 13, wherein the optical signals of different wavelengths are output along different signal paths at different times.

20. The apparatus as claimed in claim 13, wherein the first signal path is disabled based on a first predetermined condition and the second signal path is disabled based on a second predetermined condition.

21. The apparatus as claimed in claim 20, wherein the first and second predetermined conditions are different conditions.

22. The apparatus as claimed in claim 21, wherein the first and second predetermined conditions correspond to detection of failures in different seed light sources.

23. The apparatus as claimed in claim 21, wherein the first and second predetermined conditions correspond to detection of failures in different mediums used to transport the optical signals along respective ones of the first and second signal paths.

24. The apparatus as claimed in claim 13, wherein the first signal path and the second signal path are enabled at different times.

25. A network terminal comprising the apparatus of claim 13.

* * * * *